US008949391B2

(12) United States Patent
Kettlewell et al.

(10) Patent No.: US 8,949,391 B2
(45) Date of Patent: Feb. 3, 2015

(54) NETWORK MANAGEMENT ACROSS A NAT OR FIREWALL

(75) Inventors: Paul Kettlewell, Aylesbury (GB); Julian Mitchell, Maidenhead (GB); Sujata Arambepola, London (GB)

(73) Assignee: Rockstar Consortium US LP, Plano, TX (US)

( * ) Notice: Subject to any disclaimer, the term of this patent is extended or adjusted under 35 U.S.C. 154(b) by 3269 days.

(21) Appl. No.: 10/911,378

(22) Filed: Aug. 4, 2004

(65) Prior Publication Data
US 2006/0029083 A1  Feb. 9, 2006

(51) Int. Cl.
*G06F 15/177* (2006.01)
*G06F 15/16* (2006.01)
*H04L 29/12* (2006.01)
*H04L 12/26* (2006.01)
*H04L 12/24* (2006.01)

(52) U.S. Cl.
CPC ...... *H04L 61/2553* (2013.01); *H04L 29/12009* (2013.01); *H04L 29/12471* (2013.01); *H04L 43/10* (2013.01); *H04L 41/28* (2013.01)
USPC .......................................... 709/223; 709/227

(58) Field of Classification Search
USPC ................................................ 709/223, 227
See application file for complete search history.

(56) References Cited

U.S. PATENT DOCUMENTS

| | | | |
|---|---|---|---|
| 6,985,479 B2* | 1/2006 | Leung et al. | 370/352 |
| 7,152,111 B2* | 12/2006 | Allred et al. | 709/227 |
| 7,305,481 B2* | 12/2007 | Blanchet et al. | 709/230 |
| 7,421,734 B2* | 9/2008 | Ormazabal et al. | 726/11 |
| 7,483,437 B1* | 1/2009 | Mohaban | 370/400 |
| 2004/0228291 A1* | 11/2004 | Huslak et al. | 370/260 |
| 2005/0083912 A1* | 4/2005 | Afshar et al. | 370/352 |
| 2007/0136480 A1* | 6/2007 | Stephenson et al. | 709/227 |

OTHER PUBLICATIONS

RFC 3261, Copy Right © The Internet Society, J. Rosenberg, Dynamicsoft, Jun. 2002.*
RFC 3261, Copy Right © The Internet Society, J. Rosenberg, Dynamicsoft, Jun. 2002, pp. 1-269.*

* cited by examiner

*Primary Examiner* — Asghar Bilgrami
(74) *Attorney, Agent, or Firm* — Withrow & Terranova, PLLC (57) ABSTRACT

The present invention relates to methods of, computer software for and apparatus for enabling network management in a network arrangement in which a first network is separated from a second network by a network address translator or firewall. More particularly, but not exclusively, the present invention enables, in a carrier hosted solution, a) operational information relating to a device or equipment in a customer network and for use in a network management system of a carrier network and b) control information to be provided to the device or equipment by the network management system to traverse the network address translator or firewall separating the carrier and customer networks. The traversal of the network address translator or firewall is achieved by inserting the operational or control information in keep alive signalling used maintain the NAT bind or firewall pinhole.

28 Claims, 9 Drawing Sheets

NETWORK MANAGEMENT ACROSS A NAT OR FIREWALL

FIELD OF THE INVENTION

The present invention relates to methods of, computer software for and apparatus for enabling network management in a network arrangement in which a first network is separated from a second network by a network address translator or firewall. More particularly, but not exclusively, the present invention enables, in a carrier hosted solution, a) operational information relating to a device or equipment in a customer network and for use in a network management system of a carrier network and b) control information to be provided to the device or equipment by the network management system to traverse the network address translator or firewall separating the carrier and customer networks.

BACKGROUND

There is momentum in the telecommunications market to move towards carrier hosted solutions. In a carrier hosted solution, the telecommunications carrier offers communications capability to customers as a service rather than as a product. To provide a high value service, carriers would like to provide network management services such as fault management, performance monitoring and device configuration and maintenance to customers not only in respect of the communications equipment in the carrier network, but also in respect of communications equipment in the customer network. For example, in a Voice over Internet Protocol (VoIP) solution, an enterprise or residential network will include terminal devices with which users may make and receive voice or other media calls. Carriers would like to provide management services in respect of these devices using network management systems in the carrier network.

Conventionally, operational information for use in network management systems and control information sent by network management systems is communicated using standard protocols such as the Simple Network Management Protocol (SNMP) or Syslog. However, in a carrier hosted solution, there is a problem in communicating SNMP or Syslog messages between the customer network and the carrier network. Typically, Network Address Translators (NATs) and/or firewalls are deployed to provide IP address resolution and security between the internal customer network and the external carrier network. SNMP or Syslog messages from the enterprise or residential network will not generally be able to traverse the NAT or firewall.

It is possible to maintain a specific NAT bind or firewall pinhole for each managed device in the customer network to allow the SNMP or Syslog messages to traverse the NAT or firewall. However, this is undesirable for the following reasons. Firstly, by maintaining additional binds or pinholes, the security risk posed to the customer network is increased. Secondly, where NATs are used, capacity is reduced since port numbers on the external IP address are limited and hence there is only a limited number of internal IP address that may be supported by a NAT. Thirdly, the translation of various internal IP address and port number combinations in the customer network to an external IP address and port number may effect the operation of standard management protocols which use defined port numbers for various functions.

An object of the present invention is too overcome or ameliorate the problems described above.

SUMMARY OF THE INVENTION

According to one aspect of the present invention, there is provided a method of communicating operational information for use in a network management system across a NAT or firewall connecting a first and a second network, the method comprising the steps of:
  generating information indicating a detected operational condition of a device or equipment in the first network;
  inserting the generated information in a keep alive message for maintaining a NAT bind or firewall pinhole in the NAT or firewall; and
  sending the keep alive message across the NAT or firewall to an entity in the second network.

According to another aspect of the present invention, there is provided an apparatus for communicating operational information for use in a network management system across a NAT or firewall connecting a first and a second network, the apparatus comprising:
  an information generator arranged to generate information indicating a detected operational condition of a device or equipment in the first network;
  an inserter arranged to insert the generated information in a keep alive message for maintaining a NAT bind or firewall pinhole in the NAT or firewall; and
  an output interface arranged to send the keep alive message across the NAT or firewall from the first network to an entity in the second network.

Advantageously, by using a keep alive message, the operational information is communicated from the first network (for example a customer network) to the second network (for example a carrier network) without having to maintain specific NAT binds or firewall pinholes for standard network management protocol messages such as SNMP or Syslog messages. Thus security and capacity are maintained and problems arising from the interaction of SNMP or Syslog and NATs avoided.

In one embodiment, the entity in the second network is a call control entity and the keep alive message is a call control protocol message. Thus, an existing keep alive mechanism used for call control signalling is additionally used to communicate operational information without a significant increase in signalling overhead. A further advantage is that the source of the information is identifiable despite any network address translation by virtue of the call control entity having a known and pre-existing call control signalling relationship with devices in the first network.

According to another aspect of the present invention, there is provided a method of communicating operational information for use in a network management system across a NAT or firewall connecting a first and a second network, the method comprising the steps of:
  an entity in the second network receiving a keep alive message for maintaining a NAT bind or firewall pinhole in the NAT or firewall, the keep alive message comprising information indicating a detected operational condition of a device or equipment in the first network; and
  the entity forwarding the information or the keep alive message to the network management system.

In one embodiment, the forwarding step is selectively performed in dependence on the entity detecting that the information is new. Thus, unnecessary signalling in the second network is avoided.

According to another aspect of the present invention, there is provided an apparatus for communicating operational information for use in a network management system across a NAT or firewall connecting a first and a second network, the apparatus comprising:
  an input arranged to receive a keep alive message for maintaining a NAT bind or firewall pinhole, the keep alive message comprising information indicating a detected operational condition of a device or equipment in the first network; and a forwarder arranged to forward the information or the keep alive message to the network management system.

According to another aspect of the present invention, there is provided a method of communicating network management control commands across a NAT or firewall connecting a first and a second network, the method comprising the steps of:

an entity in the second network receiving a network management control command for a device in the first network;

the entity inserting the control command in a keep alive message for maintaining a NAT bind or firewall pinhole in the NAT or firewall; and the entity sending the keep alive message across the NAT or firewall to the device.

According to another aspect of the present invention, there is provided an apparatus for communicating network management control commands across a NAT or firewall connecting a first and a second network, the apparatus comprising:

an input interface arranged to receive a network management control command for a device in the first network;

an inserter arranged to insert the control command in a keep alive message for maintaining a NAT bind or firewall pinhole in the NAT or firewall; and an output interface arranged to send the keep alive message across the NAT or firewall from the first network to the second network.

Advantageously, by using a keep alive message, the network management control commands may be communicated from the first network (for example a customer network) to the second network (for example a carrier network) without having to maintain specific NAT binds or firewall pinholes for standard network management protocol messages such as SNMP or Syslog messages. Thus security and capacity are maintained and problems arising from the interaction of SNMP or Syslog and NATs avoided.

In one embodiment, the entity in the second network is a call control entity and the keep alive message is a call control protocol message. Thus, an existing keep alive mechanism used for call control signalling is additionally used to communicate network management control commands without a significant increase in signalling overhead.

In a further embodiment, the entity stores the received network management control command until the keep alive message is ready to be sent. Thus, signalling efficiency is maintained. In an alternate embodiment, receipt of the network management control command triggers sending of the keep alive message. Thus, speed of response to network management control commands is improved.

According to another aspect of the present invention, there is provided a method of communicating network management control commands across a NAT or firewall connecting a first and a second network, the method comprising the steps of:

a device in the first network receiving a keep alive message from an entity in the second network, the keep alive message being for maintaining a NAT bind or firewall pinhole in the NAT or firewall;

the device detecting that the received keep alive message comprises a network management control command for the device or for another device or equipment in the first network; and the device initiating execution of the network management control command in response to the detecting.

According to another aspect of the present invention, there is provided an apparatus for communicating network management control commands across a NAT or firewall connecting a first and a second network, the apparatus comprising:

an input interface arranged to receive a keep alive message from an entity in the second network, the keep alive message being for maintaining a NAT bind or firewall pinhole in the NAT or firewall;

a command detector arranged to detect if the received keep alive message comprises a network management control command for the device or for another device or equipment in the first network; and a command executor arranged to initiate execution of the network management control command in response to the detecting.

Other aspects of the present invention provided software for performing the above methods, whether in the form of a computer program per se or recorded on a data carrier.

Further advantages and aspects of the present invention will be apparent from the detailed description provided below.

There now follows, by way of example, a detailed description of the present invention in which:

DETAILED DESCRIPTION OF THE INVENTION

Figure 1:
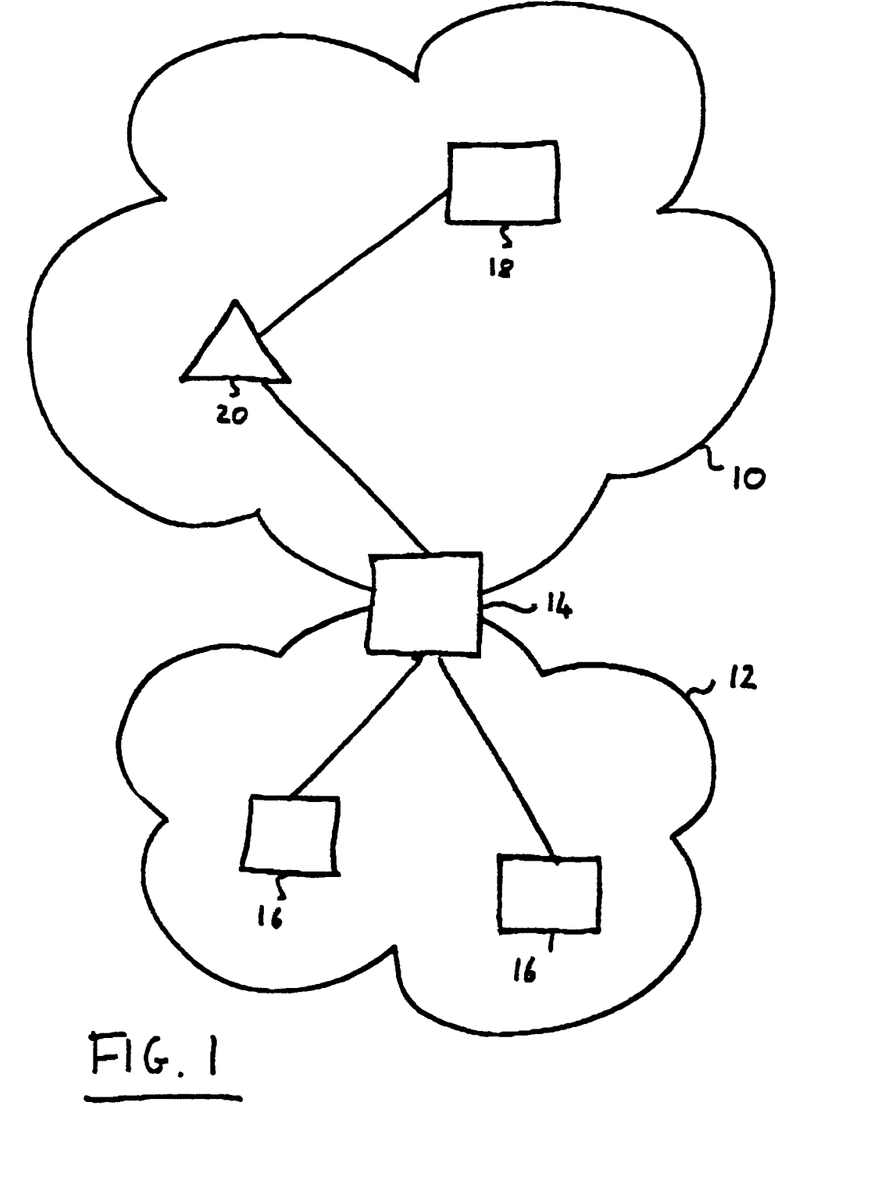
FIG. 1 is a schematic diagram showing a carrier-hosted VoIP network arrangement according to the present invention.

FIG. 1 shows a carrier-hosted VoIP network arrangement in which a carrier network 10 is connected to an enterprise or residential network 12 via NAT and/or firewall 14. Both carrier network 10 and enterprise or residential network 12 are IP networks. The present invention applies equally to NAT only implementations, firewall only implementations and NAT plus firewall implementations. In NAT implementations, NAT/firewall 14 may comprise any type of NAT including full cone, restricted cone, port restricted cone, symmetric NATs and may comprise a Network Address and Port Translator (NAPT) or Network Address Translator and Protocol Translator (NAT-PT).

A plurality of devices 16 in network 12 provide users with VoIP services. For example, devices 16 may comprise IP telephony, facsimile, or video conferencing equipment whether implemented as specific hardware devices or as software clients running on generic computing devices. Furthermore, devices 16 may comprise IP Private Branch Exchanges (PBXs) serving multiple user terminals, cable modem equipment and so on.

Carrier network 10 also includes a Network Management System NMS 18 arranged to monitor the operational condition of devices or equipment in enterprise or residential network 12 to detect various conditions and to take appropriate action such as to reconfigure devices or initiate diagnostics. For example, under the terms of a Service Level Agreement between the carrier and the customer, the carrier may be required to record network availability, maintain devices or equipment in the customer network, and report failures within a prescribed time period. The functioning of NMS 18 will not be described further as NMSs are generally well known and their functioning is not the part of the present invention.

Carrier network 10 also includes a call control entity 20 which controls the establishment, management and tearing down of calls to devices 16 according to a call control protocol. For example, the Session Initiation Protocol (SIP) may be used as the call control protocol in which case call control entity 20 is a SIP server and devices 16 each comprise a SIP User Agent (UA). Alternatively, the Media Gateway Control Protocol (MGCP) may be used as the call control protocol in which case call control entity 20 is a Media Gateway Controller (MGC) and devices 16 each comprise a Media Gateway (MGW). Other call control protocols may be used such as H.323, H.248 (Megaco) and Network Call Signalling (NCS) may be used.

To enable call control messages to be sent between call control entity 20 and devices 16, a NAT bind and/or a firewall pinhole is maintained for each device 16. The NAT bind is a mapping stored in NAT/firewall 14 which is used to translate between the internal IP address (and optionally port number) corresponding to the particular device in the enterprise or residential network 12 and the external IP address and port number combination presented to the call control entity 20 in the carrier network 10. Since external IP address and port number combinations are re-used, NAT binds are timed out after a predetermined period of inactivity, typically between 1 and 3 minutes. A firewall pinhole is an external IP address (and optionally port number) entry stored in the firewall which indicates an entity or application in the carrier network 10 which is allowed to send IP packets through NAT/firewall 14 to devices 16 in the enterprise or residential network 12. As with NAT binds, firewall pinholes are also timed out after a predetermined period of inactivity, in this case for security reasons.

To maintain the NAT bind and/or firewall pinhole in NAT/firewall 14, a "keep alive" message is sent either from each of devices 16 to call control entity 20 or, vice versa, from call control entity 20 to each of devices 16. For example, with SIP as the call control protocol, the REGISTER request method as defined in an IETF RFC 3261 may be used as a keep alive message. Thus, the SIP UA of each of devices 16 sends a SIP REGISTER request to call control entity 20—ie its SIP Server—irrespective of whether it needs to register a new location. In response, call control entity 20 returns a 200 OK response code message. Other SIP request methods may be used as keep alive messages. For a further example, with MGCP as the call control protocol, the AuditEndpoint command as defined in an IETF RFC 2705 may be used as a keep alive message. Call control entity 20—ie a MGC—sends an AuditEndpoint command to each of devices 16—ie MGWs irrespective of whether it needs to perform an audit and receives a status message in response. Other MGCP commands may be used as keep alive messages.

As can be seen from the above, keep alive messages may either be initiated from each of devices 16 or from call control entity 20. According to one embodiment of the present invention, the keep alive message (either an initiating request message or a response message) sent from each of devices 16 to call control entity 20 is augmented to include operational condition information as shown in the flow diagram of FIG. 2. At step 22 a device 16 monitors its own (local) operational condition or the operational condition of other devices or equipments in enterprise or residential network 12 to which it is connected. For example, a telephone may monitor whether it has a power connection or is operating on battery backup. For another example, a PBX may monitor whether it has lost input from telephone terminals to which it is connected. At step 24, this information is inserted into the keep alive message used to maintain the NAT bind or firewall pinhole of NAT/firewall 14. Then at step 26, this keep alive message is sent to call control entity 20.

Figure 2:
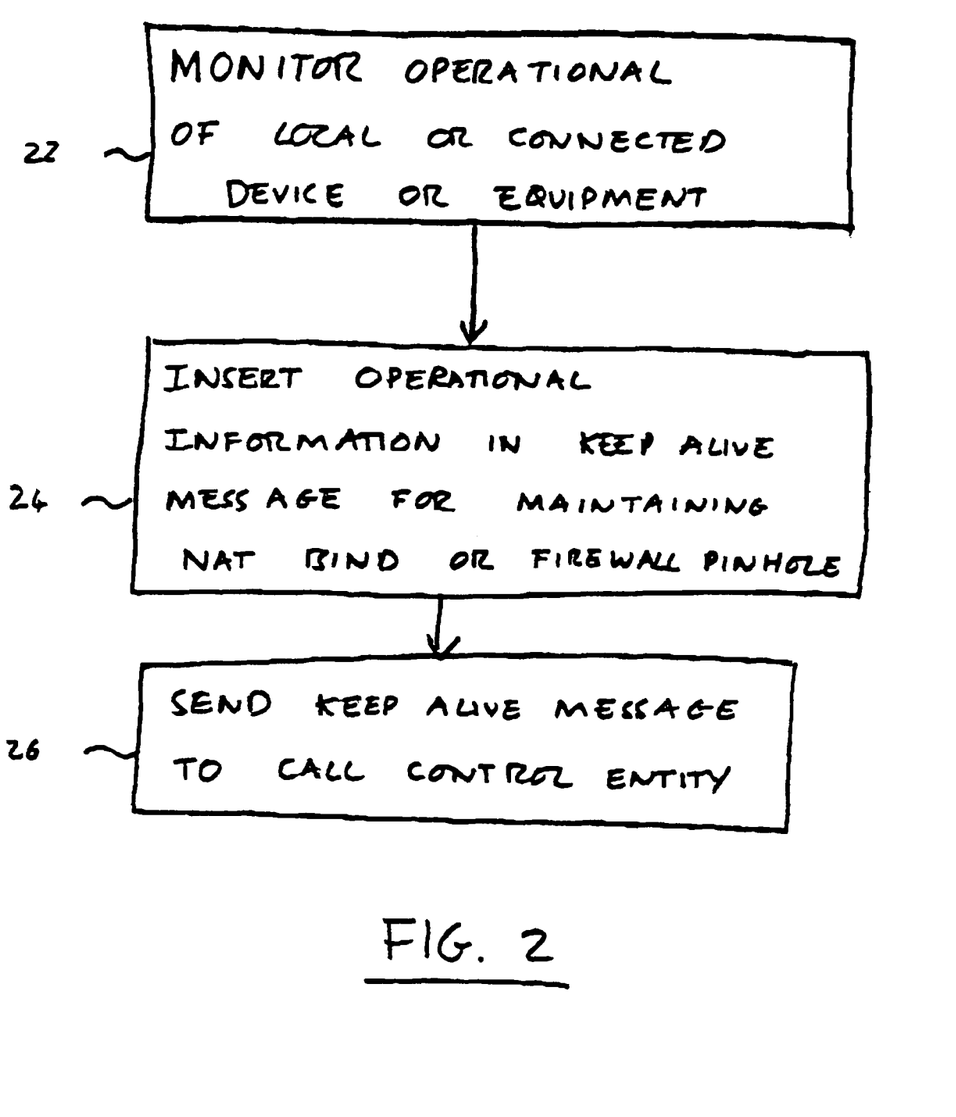
FIGS. 2 and 7 are flow diagrams showing procedures followed by a managed VoIP service device in an enterprise or residential network according to embodiments of the present invention.

With SIP as the call control protocol the following illustrates the SIP REGISTER keep alive message sent by a device with operational condition information inserted in the payload section:

```
REGISTER sip:@sip.example.com SIP/2.0
From: Joe User <sip:joe@example.com>
To: "J. User" <sip:joe@example.com>
CSeq: 18 REGISTER
Expires: 1800
Call-ID: 12345678@joespc.example.com
Contact: sip:joe@joespc example.com
Accept: text/html
Authorization: Basic h796v06g7tGg65r67
Content-Type: application/NMS
Content-Length: 24
Device=X1002
Power=1
Connection=1
QoS=1
sw=0
```

The operational condition information may be generated in plain text, a mark up language such as XML, or a succinct binary representation, for example. The operational condition information may relate to the operational condition of the device itself (the identity of which will be known to call control entity 20 from the source IP address, NAT translated source IP address or embedded identifier) or to another device or equipment (in which case the named device or equipment is identified—"X1002" in the above example). In general, the operational condition information may be inserted in the payload or header portions of keep alive messages.

In one embodiment of the present invention, the augmented keep alive message is sent periodically by each of devices 16. This may be achieved by maintaining a keep alive timer in devices 16 or call control entity 20 (whichever initiates the keep alive messaging). Provided the predetermined period of keep alive messages is shorter than the inactivity period of NAT/firewall 14, this activity serves to keep the NAT bind and/or firewall pinhole open. In an alternate embodiment, rather than periodically send a keep alive message, each of devices 16 or call control entity 20 only send a specific keep alive message if no call control protocol message has been sent between each of devices 16 or call control entity 20 for some other purpose within the predetermined period of the keep alive messages. This is more efficient in terms of call control signalling since signalling solely for the purpose of maintaining the NAT bind or firewall pinhole is avoided where signalling for other call control purposes has already reset the timers maintained by NAT/firewall 14. This may be achieved by resetting the keep alive timer at each of devices 16 or call control entity 20 (whichever initiates the keep alive messaging) each time a call control protocol message is sent or received. In this case, the call control protocol message which resets the keep alive timer may optionally itself be augmented to include operational condition information concerning the device. This at least maintains the frequency of communicating operational condition information while improving signalling efficiency. In another embodiment, generation, insertion of the operational information and sending of the keep alive message is performed in response to a device detecting a change in operation condition of itself or of another device or equipment to which it is connected. In this case, it is the device that must initiate the keep alive message. The device may then reset its keep alive timer to maintain signalling efficiency. In this document, the term keep alive message is used broadly to mean any message used to keep alive a NAT bind or firewall pinhole whether the message is only for that purpose or achieves that purpose in addition to some other purpose.

Figure 3:
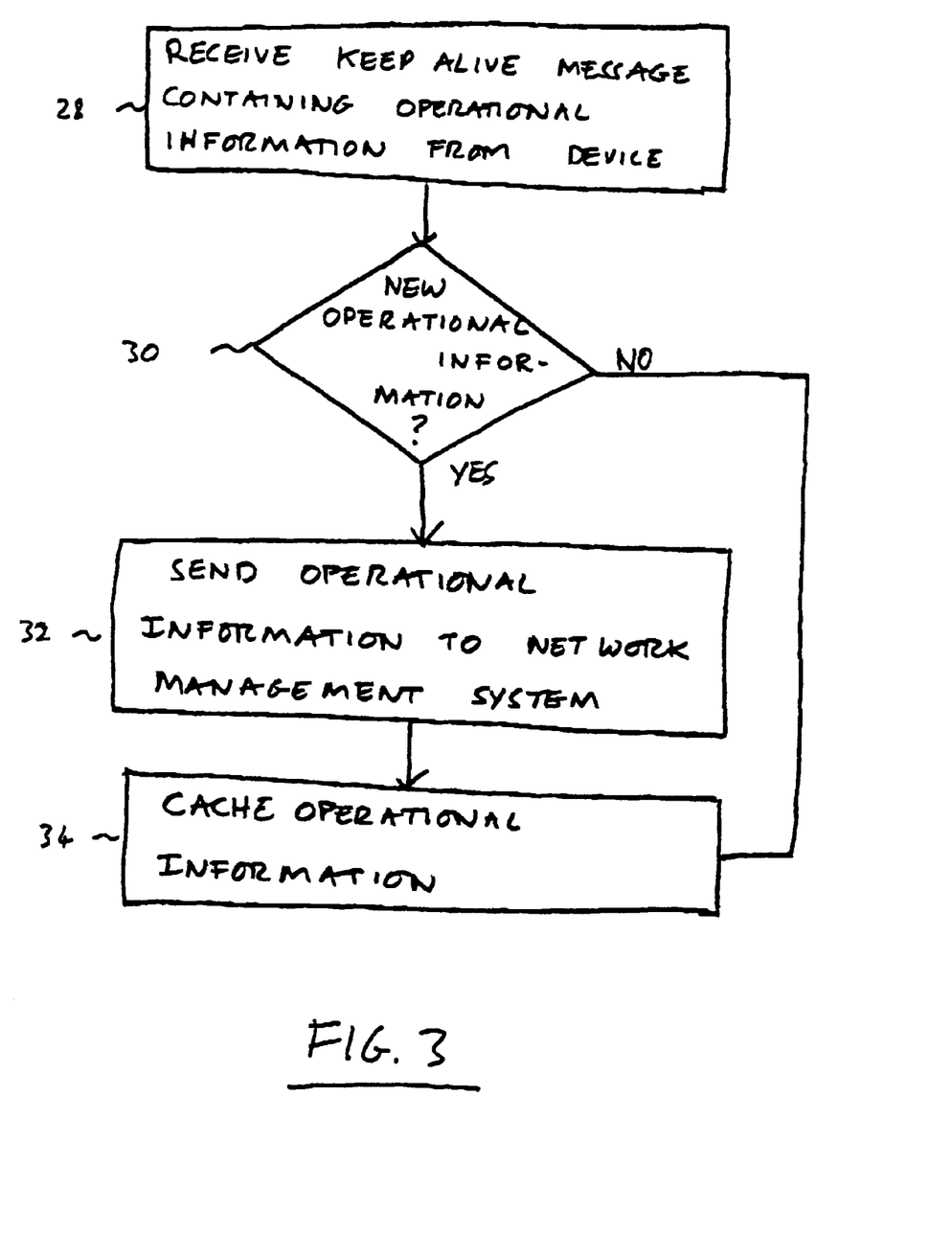
FIGS. 3 and 6 are flow diagram showing procedures followed by a call control entity in a carrier network according to embodiments of the present invention.

In respect of the operational information, call control entity 20 operates as shown in the flow diagram of FIG. 3. At step 28, call control entity 20 receives a keep alive message (or other call control protocol message) containing operational information from a device 16. At step 30, call control entity 20 determines whether the received operational information is new either because it has not yet received any operational information from that device or because it is different to previously received operational information. If is new, the process continues to step 32 where call control entity 20 send the new operational information to NMS 18. The process then continues to step 34 where call control entity 20 caches the received operational information for the device for future reference. This may overwrite any previously stored operational information. If, however, at step 30 it is determined that the received operational information is not new, the process continues directly to step 34 as described above. Thus, call control entity 20 only sends NMS 18 operational information if it is new. This is efficient in terms of signalling in carrier network 10. In an alternate embodiment of the present invention, call control entity 20 may send all received operational information to NMS 18 irrespective of whether it is new. In a further alternate embodiment of the present invention, call control entity 20 may forward all received keep alive messages to NMS 18.

Figure 4:
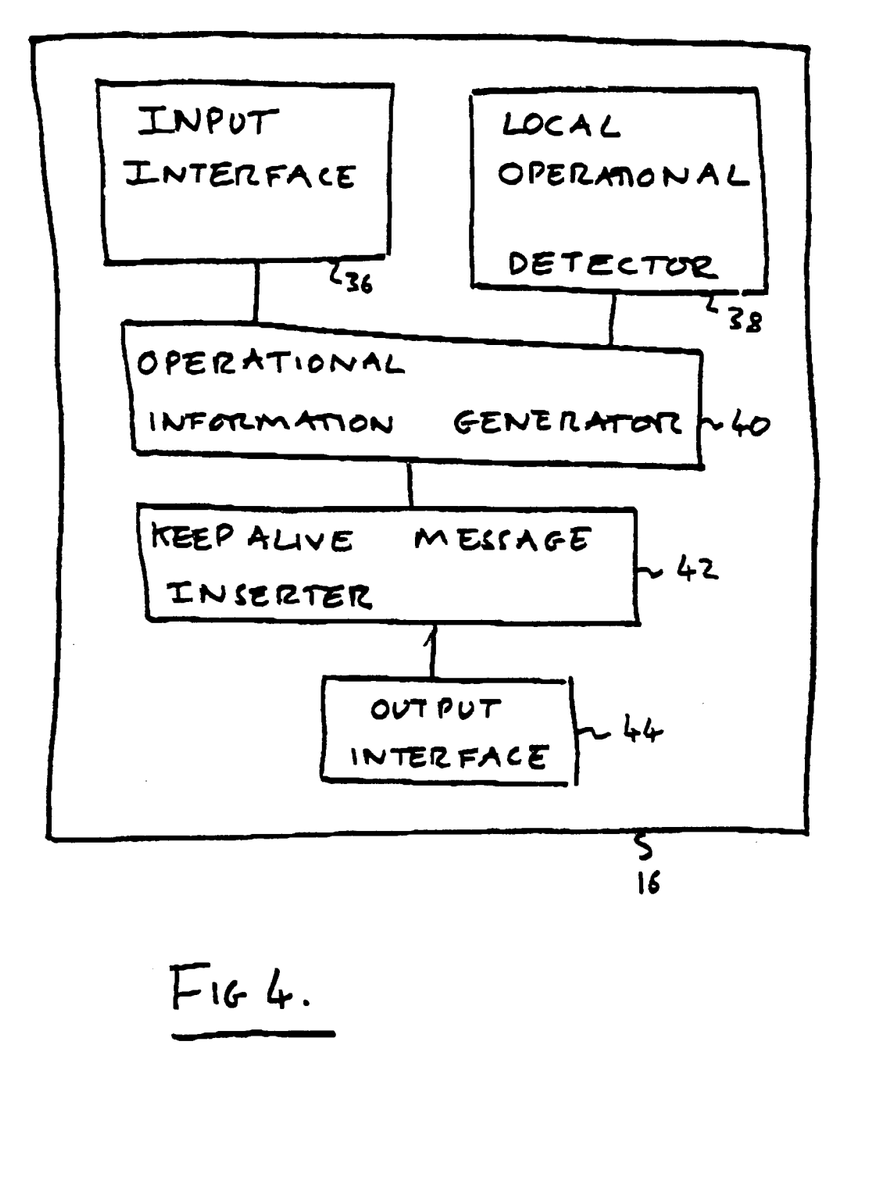
FIGS. 4 and 9 are schematic diagrams showing functional components of a device 16 according to embodiments of the present invention.

FIG. 4 shows functional components of a device 16 according to an embodiment of the present invention. Device 16 comprises an input interface 36 for receiving detected operational condition information concerning other devices or equipment in enterprise or residential network 12 to which it is connected and local operational condition detector 38 for detecting its own operational condition. Input interface 36 and local operation condition detector 38 are connected to operational information generator 40 which is arranged to generate a representation in plain text, a mark up language such as XML for example, or a succinct binary representation as described above. Operational information generator 40 is also connected to keep alive message inserter 42 which is arranged to insert the generated operational information in a keep alive message which is sent to call control entity 20 over output interface 44.

Figure 5:
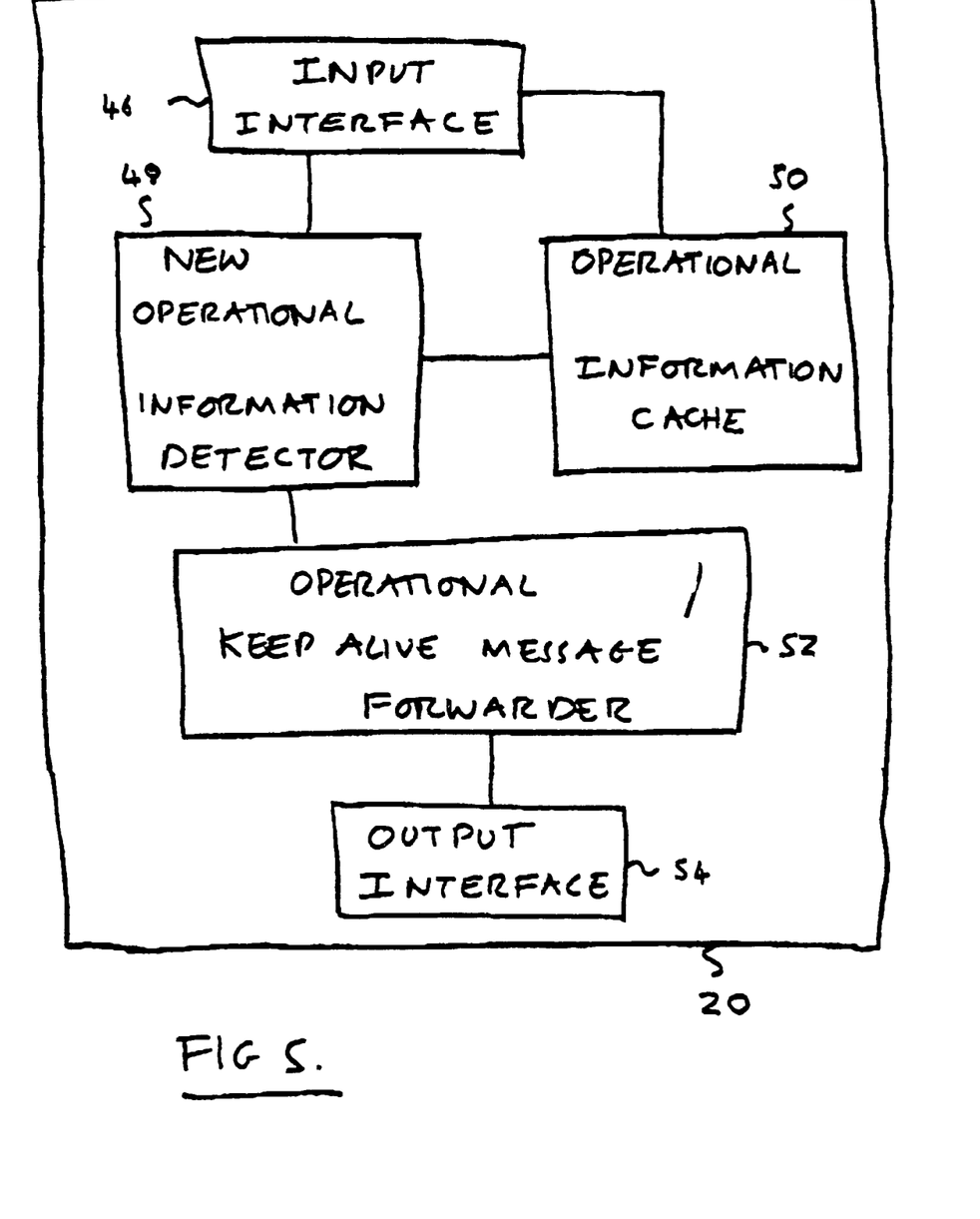
FIGS. 5 and 8 are schematic diagrams showing functional components of call control entity 20 according to embodiments of the present invention.

FIG. 5 shows functional components of call control entity 20 according to an embodiment of the present invention. Call control entity 20 comprises an input interface 46 for receiving a keep alive message from a device 16. Input interface 46 is connected to new operational information detector 48 and operational information cache 50 which stores the last received item of operational information for each managed device 16. New operational information detector 48 is arranged to compare the information of newly received keep alive messages with last received operational information stored in cache 50 to detect the presence of new information. New operational information detector 48 is arranged to control operational information/keep alive message forwarder to forward operational information/keep alive messages selectively in dependence on the detection. The operational information/keep alive messages is sent to NMS 20 over output interface 54.

Figure 6:
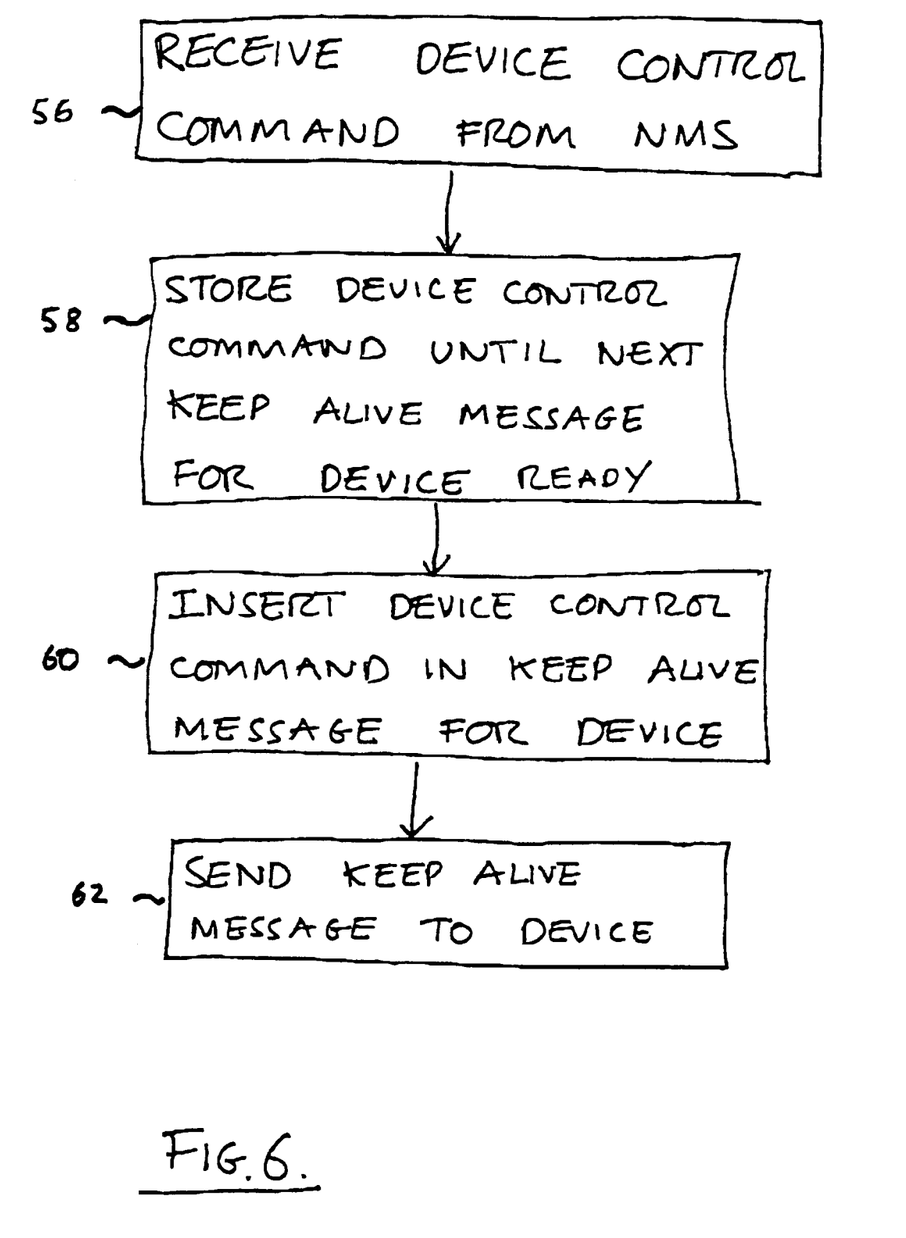

According to another embodiment of the present invention, the keep alive message (either an initiating request message or a response message) sent from call control entity 20 to any of devices 16 to is augmented to include control information for controlling the particular device or equipment to which it is connected. For example, NMS 18 may send a network management control command to configure, change operational state or initiate diagnostics at a device or equipment in enterprise or residential network 12. The process followed by call control entity 20 is shown in FIG. 6. At step 56, call control entity 20 receives a network management control command from NMS 18 for a device 16. At step 58, call control entity 20 stores the device control command until the next keep alive message (either an initiating request message or a response message) is ready to be sent. When the keep alive message is ready to be sent, at step 60 call control entity 20 inserts the network management control command into the keep alive message and sends the message to the device at step 62. This has the advantage of maintaining signalling efficiency, but may result in a delay in network management control commands being received by devices. In another embodiment, step 58 is omitted and the reception of the network management control command at step 56 triggers the generation, insertion of the network management control command, and sending of the keep alive message. In this case, the device initiates the keep alive message and may reset its keep alive timer to maintain signalling efficiency.

Figure 7:
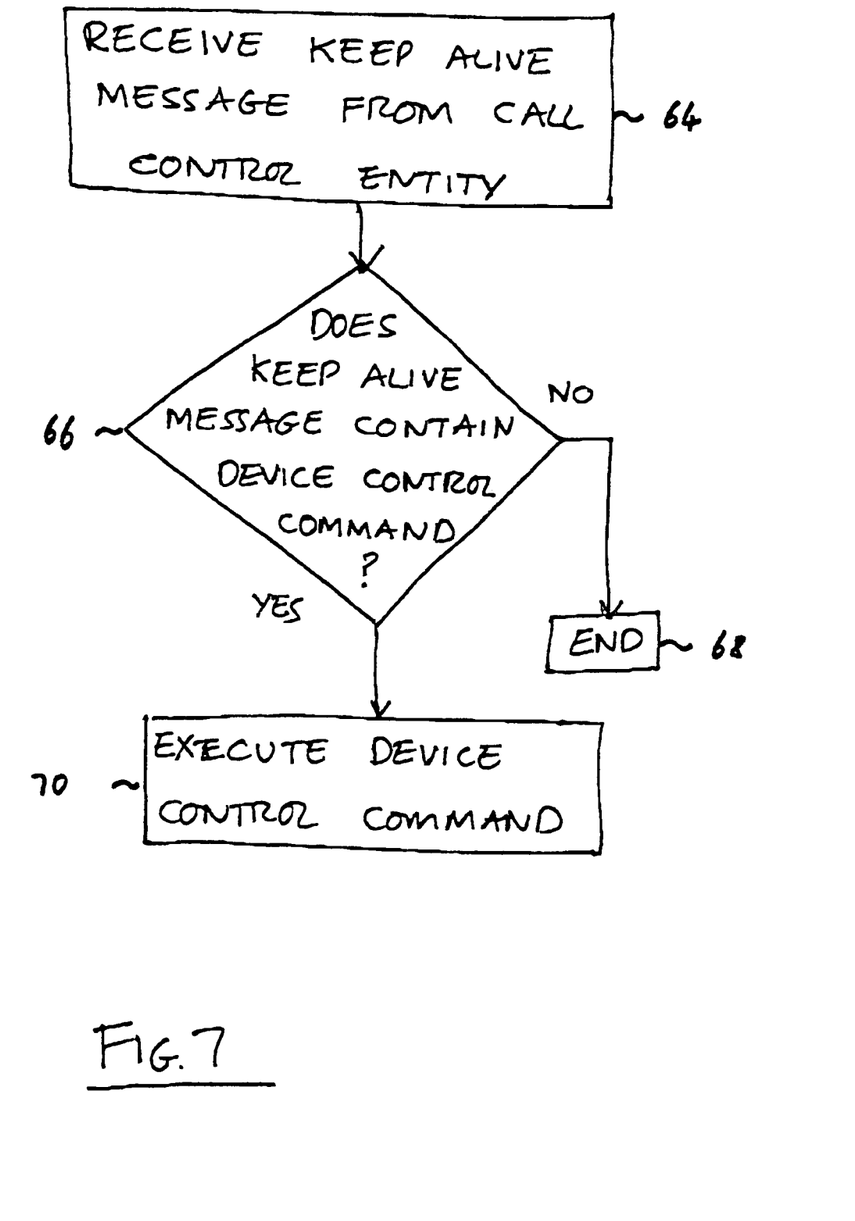

FIG. 7 shows the process followed by a device according to this embodiment of the present invention. At step 64, a device 16 receives a keep alive message from call control entity 20. At step 66, the device determined if the keep alive message contains a network management control command for the device or for another device or equipment in enterprise or residential network 12. If not, at step 68 the process ends. If yes, at step 70, the device initiates execution of the network management control command.

Figure 8:
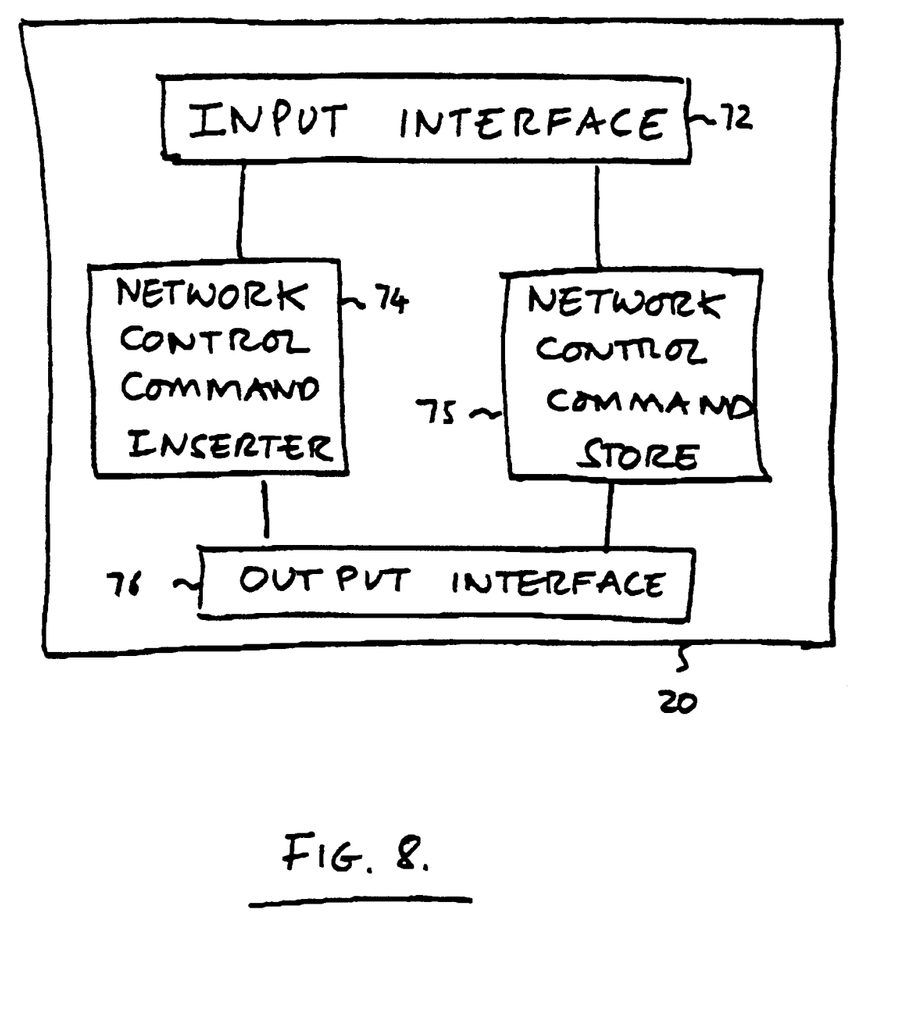

FIG. 8 shows functional components of call control entity 20 according to an embodiment of the present invention. Call control entity 20 comprises an input interface 72 for receiving a network management control for a device 16 command from NMS 18. Input interface 72 is connected to network management control command store 75 and network management control command inserter 74 which are arranged to insert the received network management control command into a keep alive message when it is ready to be sent. Network management control command inserter 74 is connected to output interface 76 for sending the keep alive message to the device 16. In an embodiment where reception of the network management control command triggers the generation, insertion of the network management control command, and sending of the keep alive message, network management control command store 75 may be omitted.

Figure 9:
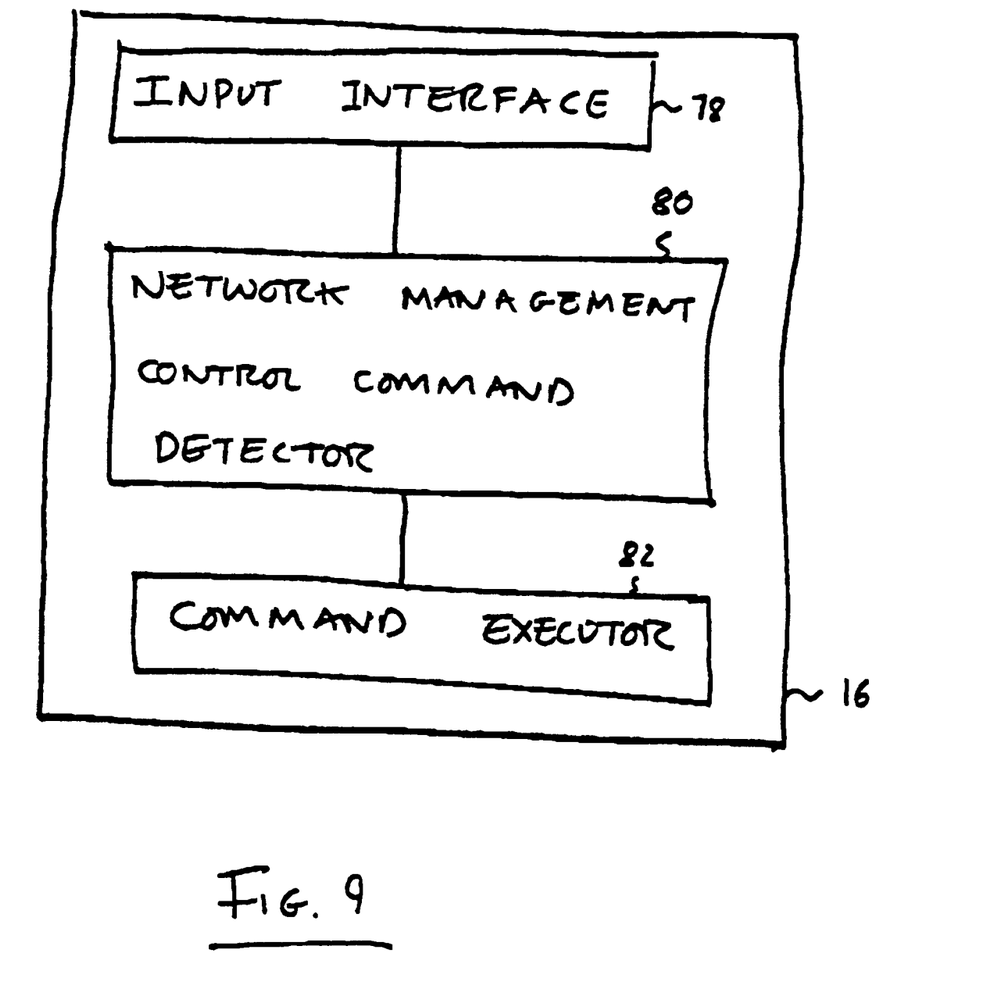

FIG. 9 shows functional components of a device 16 according to an embodiment of the present invention. Device 16 comprises an input interface 78, for receiving a keep alive message, which is connected network management control command detector 80, arranged to detect the presence of a network management control command detector in a received keep alive message. Network management control command detector 80 is further connected to command executor 82 and controls it to initiate execution of a detected network management control command.

It will be appreciated that a device such as a telephone or PBX has many components. However, in FIGS. 4 and 9, only those components which function in the present invention are illustrated. It will also be appreciated that a call control entity such as a SIP server or MGC has many components. However, in FIGS. 5 and 8, only those components which function in the prese5fT S Pvn invention are illustrated.

It will also be appreciated that the entity in the carrier network that communicates the operational information or network management control commands between a device and the NMS need not be a terminating call control entity. Other entities in the carrier network which receive the keep alive message may perform the functions described above with respect to the call control entity 20. For example, a SIP proxy which proxies the SIP call control signalling between a SIP User Agent and a terminating SIP server may perform these functions.

It will also be appreciated that the present invention has application to network arrangements other than carrier hosted VoIP network arrangements. In general, the present invention has application to any network arrangement requiring the communication of operation information for use in network management systems and/or control or configuration information by network management systems across a NAT and/or firewall.

The invention claimed is:

1. A method of communicating operational information for use in a network management system across a NAT or firewall connecting a first and a second network, the method comprising the steps of:
generating information indicating a detected operational condition of a device or equipment in the first network;
inserting the generated information in a keep alive message for maintaining a NAT bind or firewall pinhole in the NAT or firewall; and
sending the keep alive message across the NAT or firewall to an entity in the second network.

2. A method according to claim 1, wherein the keep alive message is a call control protocol message.

3. A method according to claim 1, wherein the entity in the second network is a call control entity.

4. Apparatus for communicating operational information for use in a network management system across a NAT or firewall connecting a first and a second network, the apparatus comprising:
an information generator arranged to generate information indicating a detected operational condition of a device or equipment in the first network;
an inserter arranged to insert the generated information in a keep alive message for maintaining a NAT bind or firewall pinhole in the NAT or firewall; and
an output interface arranged to send the keep alive message across the NAT or firewall from the first network to an entity in the second network.

5. An apparatus according to claim 4, wherein the keep alive message is a call control protocol message.

6. An apparatus according to claim 4, wherein the entity in the second network is a call control entity.

7. A method of communicating operational information for use in a network management system across a NAT or firewall connecting a first and a second network, the method comprising the steps of:
an entity in the second network receiving a keep alive message for maintaining a NAT bind or firewall pinhole in the NAT or firewall, the keep alive message comprising information indicating a detected operational condition of a device or equipment in the first network; and
the entity forwarding the information or the keep alive message to the network management system.

8. A method according to claim 7, wherein the forwarding step is selectively performed in dependence on the entity detecting that the information is new.

9. A method according to claim 7, wherein the entity in the second network is a call control entity.

10. A method according to claim 7, wherein the keep alive message is a call control protocol message.

11. A server for communicating operational information for use in a network management system across a NAT or firewall connecting a first and a second network, the server comprising:
an input interface arranged to receive a keep alive message for maintaining a NAT bind or firewall pinhole in the NAT or firewall from a device, the keep alive message comprising information indicating a detected operational condition of a device or equipment in the first network; and
a forwarder arranged to forward the information or the keep alive message to the network management system via an output interface.

12. A server according to claim 11, wherein the server comprises a detector arranged to detect whether the information is new and wherein the forwarder is arranged to selectively forward the information in dependence on the detector detecting that the information is new.

13. A server according to claim 11, wherein the server is a call control entity.

14. A server according to claim 11, wherein the keep alive message is a call control protocol message.

15. A method of communicating network management control commands across a NAT or firewall connecting a first and a second network, the method comprising the steps of:
an entity in the second network receiving a network management control command for a device in the first network;
the entity inserting the control command in a keep alive message for maintaining a NAT bind or firewall pinhole in the NAT or firewall; and
the entity sending the keep alive message across the NAT or firewall to the device.

16. A method according to claim 15, wherein the keep alive message is a call control protocol message.

17. A method according to claim 15, wherein the entity in the second network is a call control entity.

18. A method according to claim 15, wherein the entity stores the received network management control command until the keep alive message is ready to be sent.

19. A method according to claim 15, wherein receipt of the network management control command triggers sending of the keep alive message.

20. A hardware device for communicating network management control commands across a NAT or firewall connecting a first and a second network, the server comprising:
an input interface arranged to receive a network management control command for a device in the first network;
an inserter arranged to insert the control command in a keep alive message for maintaining a NAT bind or firewall pinhole in the NAT or firewall; and
an output interface arranged to send the keep alive message across the NAT or firewall from the first network to the second network.

21. A hardware device according to claim 20, wherein the keep alive message is a call control protocol message.

22. A hardware device according to claim 20, wherein the apparatus is a call control entity.

23. A method of communicating network management control commands across a NAT or firewall connecting a first and a second network, the method comprising the steps of:
- a device in the first network receiving a keep alive message from an entity in the second network, the keep alive message being for maintaining a NAT bind or firewall pinhole in the NAT or firewall;
- the device detecting that the received keep alive message comprises a network management control command for the device or for another device or equipment in the first network; and
- the device initiating execution of the network management control command in response to the detecting.

24. A method according to claim 23, wherein the keep alive message is a call control protocol message.

25. A method according to claim 23, wherein the entity in the second network is a call control entity.

26. A server for communicating network management control commands across a NAT or firewall connecting a first and a second network, the server comprising:
- an input interface arranged to receive a keep alive message from an entity in the second network, the keep alive message being for maintaining a NAT bind or firewall pinhole in the NAT or firewall;
- a command detector arranged to detect if the received keep alive message comprises a network management control command for the device or for another device or equipment in the first network; and
- a command executor arranged to initiate execution of the network management control command in response to the detecting.

27. A server according to claim 26, wherein the keep alive message is a call control protocol message.

28. A server according to claim 26, wherein the entity in the second network is a call control entity.

* * * * *